Aug. 8, 1961 W. V. LOHRMAN ET AL 2,995,385
HYDRAULIC WHEEL DRAWBAR
Filed Jan. 26, 1959 5 Sheets-Sheet 3

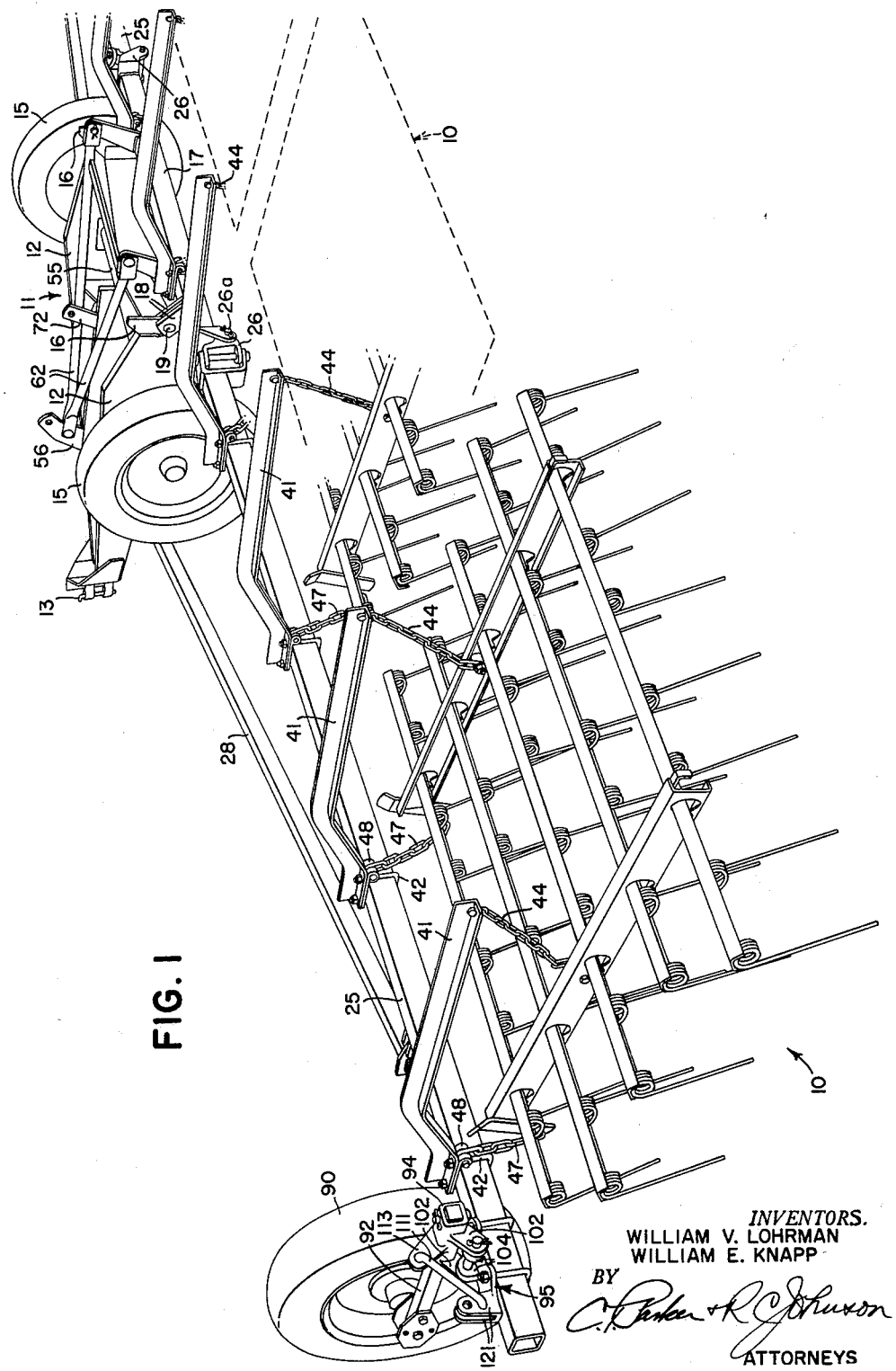

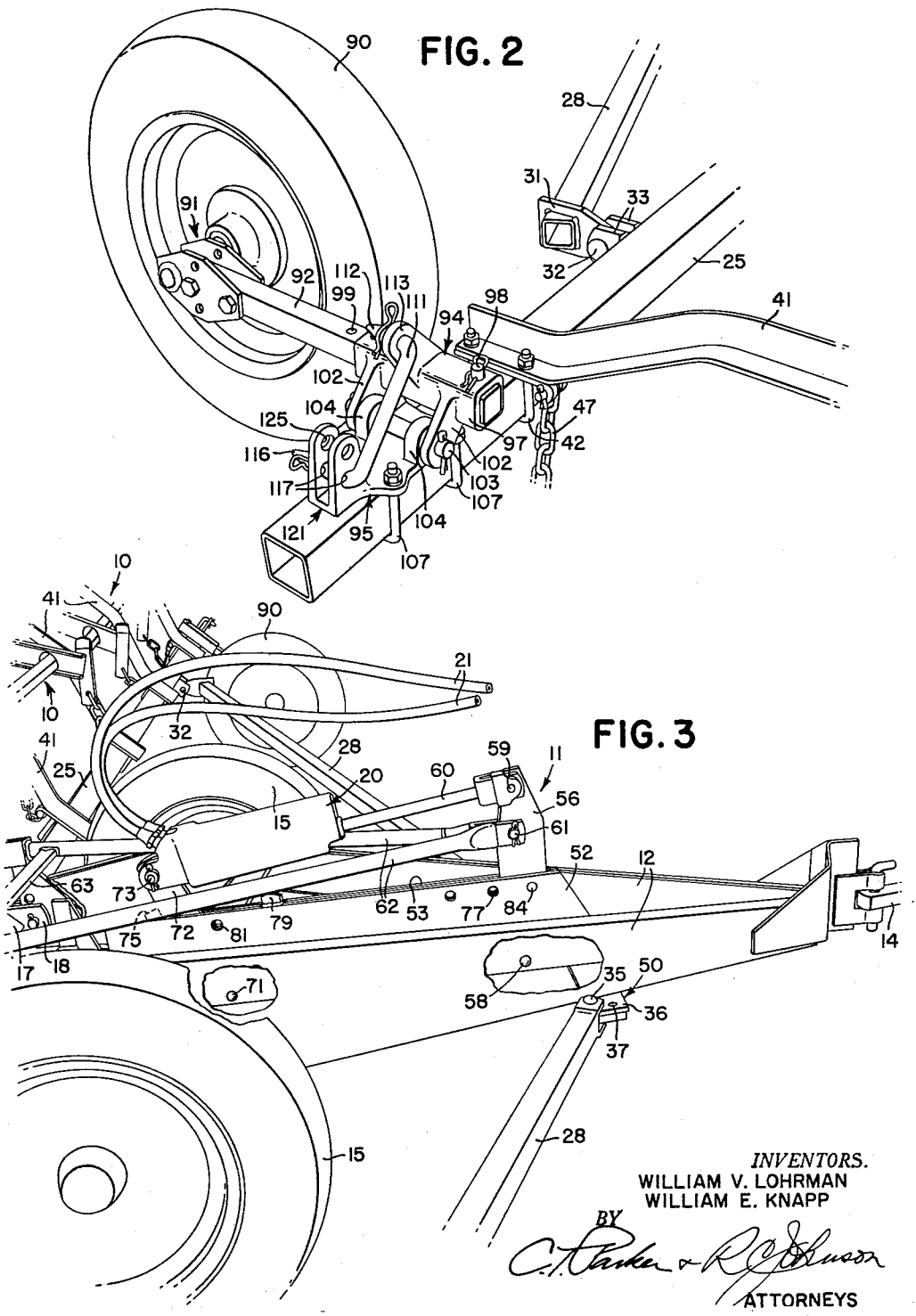

*INVENTORS*
WILLIAM V. LOHRMAN
WILLIAM E. KNAPP

ATTORNEYS

INVENTORS.
WILLIAM V. LOHRMAN
WILLIAM E. KNAPP
BY
ATTORNEYS

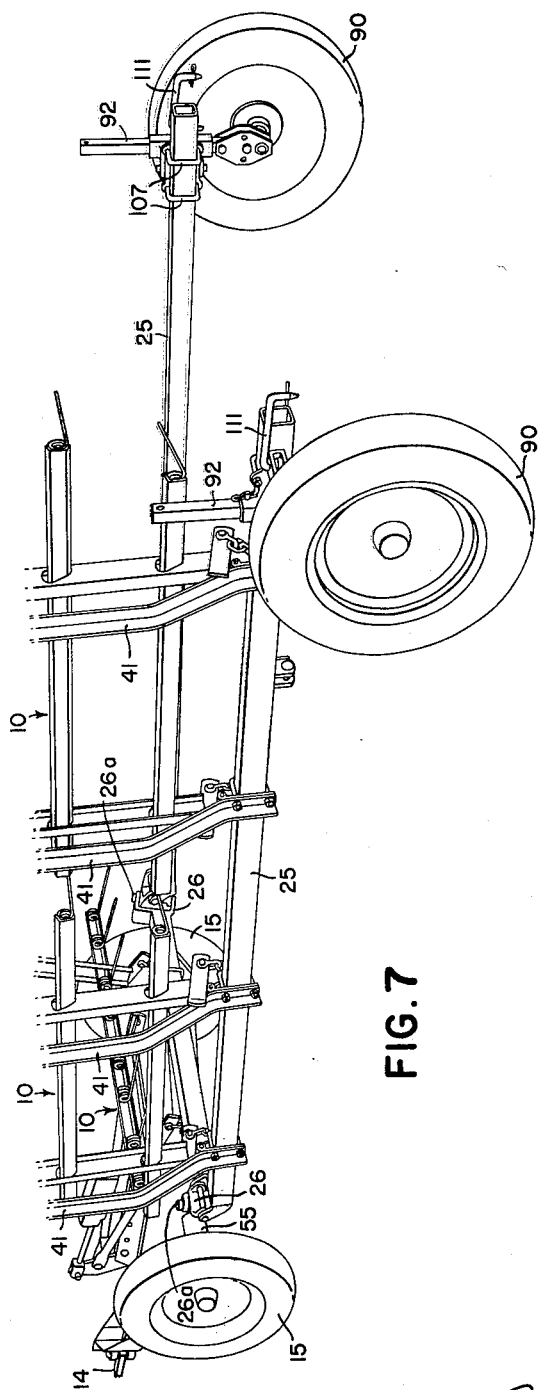

United States Patent Office 2,995,385
Patented Aug. 8, 1961

2,995,385
HYDRAULIC WHEEL DRAWBAR
William V. Lohrman, Davenport, Iowa, and William E. Knapp, Los Angeles, Calif., assignors to Deere & Company, Moline, Ill., a corporation of Delaware
Filed Jan. 26, 1959, Ser. No. 788,827
12 Claims. (Cl. 280—412)

This invention relates generally to agricultural implements and more particularly to wheeled folding drawbar supports of the type to which a plurality of units, such as spike tooth harrow sections, for example, may be connected in side-by-side relation to provide an implement that works a relatively wide strip of ground.

The object of and general nature of this invention is the provision of an improved means for supporting the outer sections of the folding drawbar so as to facilitate bringing the latter into and out of working and transport positions with a minimum of manual effort. More specifically, it is an important feature of this invention to provide means operated in conjunction with associated hydraulic drawbar rocking means whereby the wheels for the outer ends of the folding sections may be disposed for operation either in a widespread position or for operation in the trailing or transport position in which the width of the implement is substantially narrowed to facilitate passage along the highways, through narrow lanes, gates and the like.

Specifically, the present invention contemplates the provision of a wheel mounting in the form of a wheel axle receiving bearing member swingably connected with the outer end of the associated outer drawbar member, with means positively holding the axle bearing member in any one of three optional positions, one holding the associated ground wheel in a position facilitating forward travel during normal operation in widespread position, a second position positively holding the ground wheel in a position facilitating travel during transport, during which time the outer bar sections are folded into substantially parallel fore and aft extending positions, and a third position in which the wheel is disposed at a slight angle relative to the direction of travel during transport, whereby the outer bars may readily be shifted from a trailing or transport position outwardly into their widespread or operating position by backing the tractor which propels the implement.

These and other objects and advantages of this invention will be apparent to those skilled in the art after a consideration of the following detailed description, taken in conjunction with the accompanying drawings, in which:

FIG. 1 is a fragmentary perspective view showing a wheel carried hydraulic drawbar support in its working position in which the outer bars are arranged in their widespread or laterally outwardly extending relation with the outer end of the outer bars supported on a pair of ground wheels.

FIG. 2 is an enlarged perspective view of one of the supporting wheels and its mounting structure connected with the outer end of the associated outer bar, the parts being shown in the positions they occupy when arranged for operation as illustrated in FIG. 1.

FIG. 3 is a perspective view showing the field transport position of the drawbar, the outer bars and the associated wheels being shifted by hydraulic power through approximately 45° from the position shown in FIG. 1 so as to raise the associated harrow sections entirely off the ground.

FIG. 7 is a fragmentary perspective view of the wheel supported drawbar of this invention when disposed in its road or transport position, portions being omitted for purposes of clarity.

Figure 8:
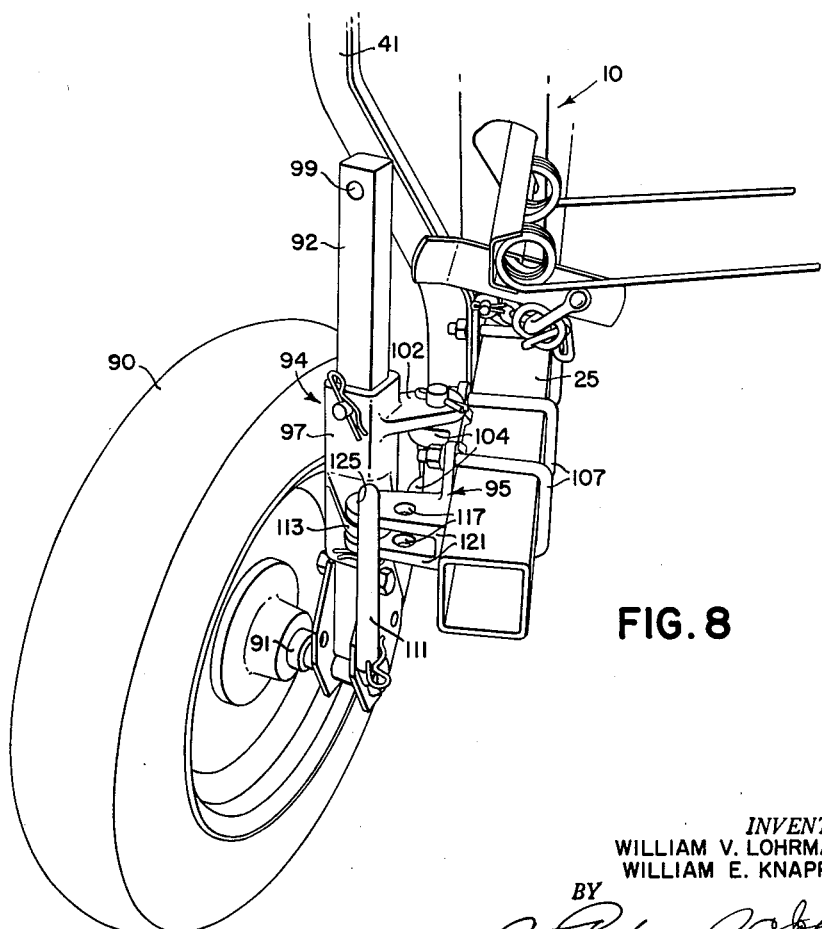

FIG. 8 is an enlarged fragmentary view of one of the adjustable ground wheels arranged in its position extending at a slight angle to the associated outer bar so that, when the outfit backed in its road transport position (FIG. 7), the angle of the ground wheels will cause the outer bars to be swung laterally outwardly until they are disposed in alignment with the center bars in their widespread position, similar to that of FIG. 1.

Referring first to FIG. 1, the principles of this invention have been illustrated as incorporated in a wheel supported folding drawbar arrangement particularly adapted to carry five spring tooth harrow sections, each indicated by the reference numeral 10, the harrow sections 10 being conventional so far as the principles of this invention are concerned. The folding drawbar arrangement shown in FIG. 1 incorporates a wheeled carriage 11 that includes a pair of laterally spaced apart forwardly converging frame members 12, the front end of which are provided with hitch means 13 to which a tractor, represented by the tractor drawbar 14 (FIGS. 3 and 7), may be connected in the usual way. The carriage 11 is supported on spaced apart wheels 15 and from FIG. 1 it will be seen that frame members 12 extend rearwardly beyond the wheels 15 and carry vertically extending apertured lugs 16 to which a rockable central transversely disposed bar 17 is connected, as by pairs of apertured lugs 18, with a pivot pin 19 hingedly connecting each pair of lugs 18 with the associated apertured frame section 16. The wheel axle 55 carrying the wheels 15 is fixed to the frame members 12 by any suitable means. When the front end of the carriage 11 is hitched to the tractor 14, the carriage is supported at its rear portion on the wheels 15 and at its forward portion on the tractor, thereby providing a stable arrangement.

The tractor 14 (FIG. 3) is equipped with the usual hydraulic power operated lift mechanism and includes a remote ram unit 20 connected into the tractor hydraulic system by a pair of hose lines 21. For purposes of clarity, the unit 20 has been omitted in FIG. 1. The mounting of the unit 20 and associated connections will be described in detail below, and therefore it will suffice for the present to note that at this point by utilizing the unit 20, the center drawbar section 17 may be rocked about a transverse axis, as defined by the pins 19, from a working or lowered position, shown in FIG. 1, through substantially 45° so as to lift the associated implement units 10 off the ground (FIG. 3), and then through another 45° to raise the units 10 into a substantially vertical position as indicated fragmentarily in FIG. 5.

The outer drawbar members are indicated at 25 in FIG. 1 and in their working positions these members extend axially outwardly and in substantially alignment with the center power-operated drawbar member 17, the outer bars 25 being connected with the center bar 17 through universal joint connections indicated at 26, such articulated joint means being conventional so far as this invention is concerned. In the working or laterally outwardly extended position, the outer portions of the outer bars 25 are reinforced by braces in the form of truss bars 28. As best shown in FIG. 2, the outer end of each truss bar 28 is provided with an attaching plate 31 that is apertured to receive a quick detachable pin 32 connecting the part 31 with a pair of apertured lugs 33 that are fixed to the adjacent portion of the associated outer bar 25. The inner end (FIG. 3) of each truss bar 28 is apertured to receive a quick detachable pin 35 that connects the bar to an apertured lug 36 carried by the adjacent frame member 12. A plurality of openings 37 in each lug 36 provide for optional connection of the truss bars 28 to the carriage 11 so as to provide some adjustment for the outer bars in their extended or working position. The center bar 17 and the outer bars 25 carry intermediate supporting arms 41, each member 41 comprising an angle bent into suitable formation and apertured to receive clamping U-bolts 42. Each set of arms 41 is fixed to the associated bar in different positions of adjustment along the bar, depending upon the size and character of implement units connected therewith. Preferably, as shown in FIG. 1, the rear ends of the bars 41 are provided with supporting chains 44 that extend from the bars generally to the central portions of the associated units whereby when the drawbar members 17 and 25 are raised, as by operation of the power unit 20, the implement units 10 are raised, as to the position shown in FIG. 3 or to the position shown in FIG. 5. Draft is applied to the implement units, such as the harrow sections 10 shown in FIG. 1, by pairs of pull chains 47 connectible with the forward portions of the associated implement units 10 and with hitch brackets 48 clamped to the associated bars 17 and 25 by the associated clamping bolts 42.

Figure 5:
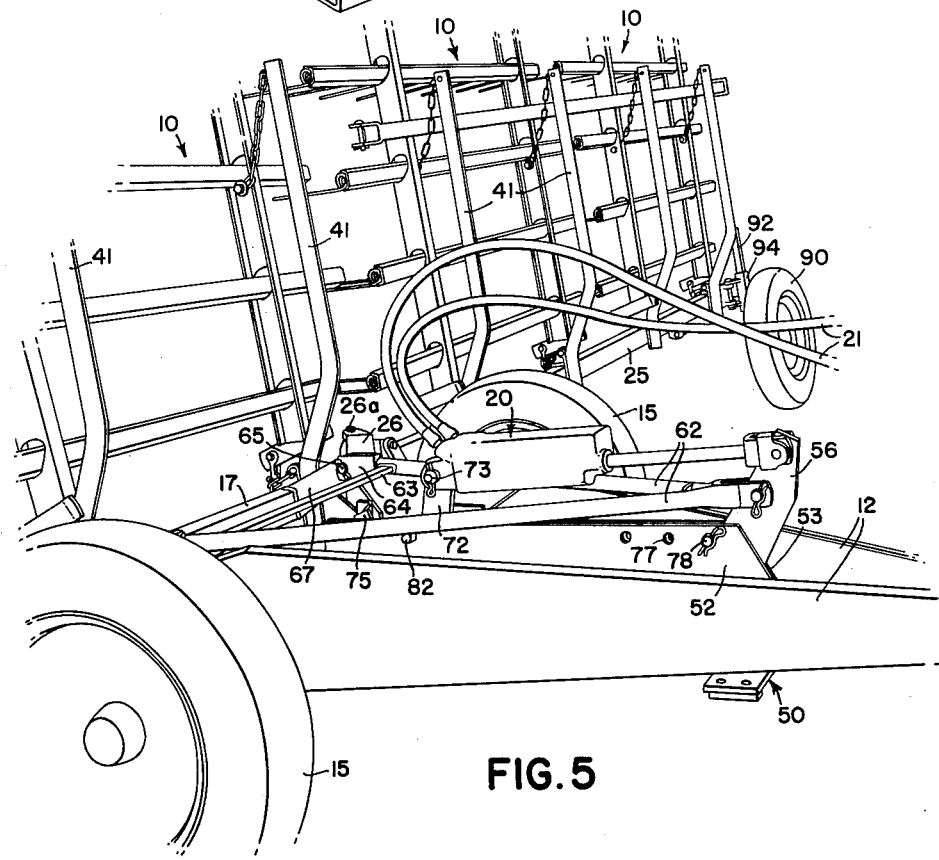
FIG. 5 is a view similar to FIG. 3 showing the harrow sections raised through substantially 90°, with the outer ends of the outer bars supported on the outer ground wheels so that when the operator drives forward the outer bars will be swung pivotally into a trailing or narrow transport position.

The articulated drawbar means 17, 25 is adapted to be rocked from a normal working position, FIG. 1, through approximately 45° to a field transport position, FIG. 3, in which the several implement units 10 are lifted off the ground. However, in this field transport position the outer bars 25 and the associated implement units are still in their widespread position, but the implement may readily be turned or maneuvered, provided there is sufficient space to do so. Also, the implement may, if desired, and if there is adequate space, be transported in this position from place to place, but in view of the extra width of the implement when arranged in this way, which may be undesirable where maneuvering in relatively confined space is required, provision is made for additionally rocking the drawbar means 17, 25 through another 45° so as to raise the arms 41 substantially to a vertical position as shown in FIG. 5. The wheeled drawbar may now be narrowed for transport through gates, along roads and lanes, etc., by the following steps. First, the truss bars 28 are disconnected, after which the outer bars 25 may swing about one of their universal joint axes rearwardly into a folded or transport position, as by driving the implement forwardly a short distance from the position shown in FIG. 5. The universal joints 26 are so arranged that when the section 17 is rocked through 90° by the operation of the power unit 20, the universal joint pivots 26a are substantially vertical, which permits the outer bars 25 to swing horizontally rearwardly from the position shown in FIG. 5 to the position shown in FIG. 7.

New and improved means have been provided for mounting the tractor power cylinder 20 on the carriage 11 so as to utilize the full capacity of the unit 20 for raising the implements to each of the two stages mentioned above. The cylinder mounting means will now be described.

The apertured lugs 36 (FIG. 3) mentioned above form a part of a transverse bar 50 that is securely fixed, as by bolts or the like, to the lower flanges of the forward portions of the frame members 12. The latter members are in the form of channels having their upper and lower flanges extending laterally inwardly, and the lower flanges are apertured to receive the above mentioned bar-attaching bolts. A pair of elongated vertical plates 52 and 53 are fixed at the forward ends to the general central portion of the transverse bar 50 and the rear ends of the plates 52 and 53 are fixed to the generally central portion of the axle 55 which may take the form of a transverse pipe member, on which the wheels 15 are journalled. The two plates 52 and 53 are fixed to the carriage with a space between the plates so as to provide for the reception of the cylinder-supporting arms therebetween. One of the cylinder-supporting arms is indicated at 56 and is mounted for pivotal movement at its lower end on a transverse pivot 58. The upper end of the arm 56 extends beyond the plates 52 and 53 and the upper portion is apertured to receive a pivot member 59 that connects the forward or piston end 60 of the unit 20 to the arm 56. Below the pivot 59 the arm 56 is apertured to receive a cross pin 61 to which a pair of lift bars 62 are pivotally connected. The bars 62 extend divergently rearwardly to receive a transverse reinforcing crosspiece 63 and the rear ends of the bars 62 are provided with bifurcated portions 64 that are apertured to receive pivot pins 65 by which the bars 62 are connected to arms 67 that are welded to the end portions of the center drawbar member 17. Thus, rocking the forward arm or lever 56 servies to rock the drawbar 17 and the associated end bars 25 for raising and lowering the associated implement units 10. The optionally operable means that is provided for holding the arm 56 in different positions, as necessary to provide the two-stage operation mentioned above, will be described below.

Figure 6:
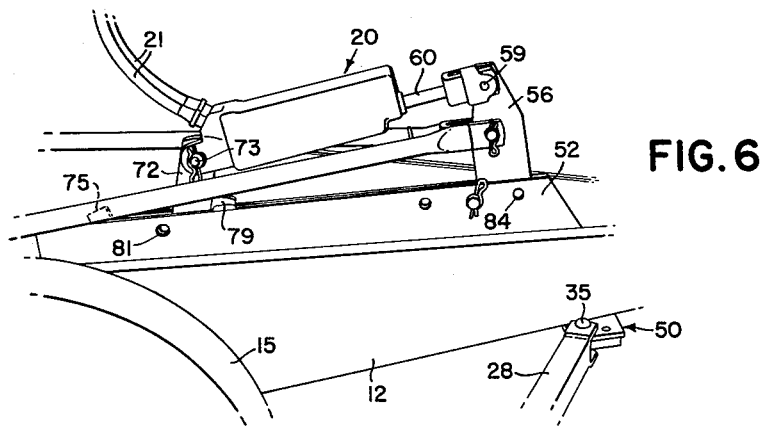
FIG. 6 is a fragmentary view of a hydraulic lifting unit, showing the same in the position it occupies when holding the working implement units in their field transport position.

The rear portions of the plate members 52 and 53 are apertured to receive a pin 71 on which the lower apertured end of the rear cylinder-receiving arm 72 is mounted. The arm 72 is apertured at its uppermost end to receive a quick attachable pin 73 that attaches the rear or cylinder end of the unit 20 to the arm 72. A rear stop 75 is welded in between plates 52 and 53 and is disposed in a position to limit the rearward swinging of the arm 72 when the parts are raised as shown in FIG. 3, the stop 75 serving as an abutment against which the unit 20 may operate to shift the forward arm 56 from the position shown in FIG. 1 to the position shown in FIG. 3, which movement of the arm 56 and links 62 serves to rock the drawbar 17, 25 through approximately 45° and thus raises the implement units 10 off the ground. In moving the arm 56 to the position just mentioned, the unit 20 has extended its full predetermined amount, and this is sufficient to shift the arm 56 a slight distance forwardly of a pair of openings 77 (FIG. 3) in the forward positions of the plates 52 and 53. A pin 78 may now be disposed in the openings 77 after which retraction of the unit 20 acts against the pin 78 as an abutment to swing the rear arm 72 forwardly to substantially the position shown in FIG. 6, this being an idle movement so far as raising or lowering the implement units 10 is concerned. The aforesaid forward movement of the rear arm 72 carries the latter into a position substantially in contact with an abutment or stop 79 that is fixed to the plates 52 and 53 a distance forward of the rear stop 75. The movement on the arm 72 up against the stop 79 disposes the arm 72 in a position slightly ahead of the pair of openings 81 formed in the plates 52 and 53 so that a pin, such as pin 82 shown in FIG. 5, may now be disposed in the openings 81 to serve as an abutment preventing the rearward movement of the arm 72. Extension of the power unit 20, when the pin 82 is in place as shown in FIG. 5, results in an additional forward swinging of the front or arm 56 which imparts an additional 45° movement to the drawbar sections 17 and 25, as shown in FIG. 5, swinging the units 10 up to their substantially vertical position. The arm 56 may be locked in this position by disposing the forward pin 78 in an additional set of openings 84 (FIG. 6). The pins 78 in this position serve as a positive lock for holding the implement units in their elevated position. The cylinder 20 may now be slightly retracted to relieve pressure on the pivot pins 59 and 73, the openings 81 being disposed relative to the stop 79 so that there is a slight amount of lost motion available for the arms 72. The cylinder 20 may then be removed and the implement units 10 held in the vertical position (FIG. 5) by the lock-up pin 78.

For road transport it is necessary to have the normally outwardly extending drawbar sections 25 swung backwardly into a folded or trailing position (FIG. 7) and in order to accomplish this easily and quickly the present invention contemplates a new and improved outer wheel mounting that makes it possible to shift the outer gauge wheels from their working position (FIG. 1) into a position accommodating transport of the drawbars 25 in a trailing or folded position. The outer gauge wheels and their mounting means will now be described.

FIG. 2 shows the right hand bar supporting an outrigger wheel in its normal working position, corresponding to the position shown in FIG. 1, and the mounting mechanism for the outer or gauge wheels, with which the present invention is particularly concerned, will now be described.

Each of the outer or gauge wheels is indicated by the reference numeral 90 and is shown as journaled on a stub axle means 91 bolted to an axle standard bar 92. The forward or upper end of the bar, which is square in cross section, is received in a laterally swingable axle bearing member 94 carrier by suitable mounting means 95 on the adjacent outer end portion of the associated bar 25. The member 94 includes a sleeve section 97 shaped to non-rotatably receive the wheel standard 92 but the latter is slidably disposed within the sleeve section 97 and is held in different positions therein by means of a locking pin 98 that is insertable in the openings in the upper portion of the sleeve section 97 and a selected opening 99 in the standard 92. The axle bearing member 94 is provided with a pair of apertured lugs 102 that are swingable on a cross pin 103 carried in apertured lugs 104 formed on the support member 95 that is adjustably fixed by U-bolts clamps 107 to the associated bar 25.

The axle bearing member 94 and the wheel 90 and associated parts are held in their normal working position (FIG. 1) in which the wheels 90 support the outer ends of the bars 25 for generally vertical movement relative to the central carriage 11, by means of a U-shaped locking member 111 having one end 112 inserted in an opening in an apertured lug 113 carried on the member 94, the other end 116 of the locking member 111 being inserted in an inner set of openings 117 (FIG. 8) formed in apertured lug means 121 carried by or formed on the support member 95.

With the wheels 90 and associated parts locked in the position just described, whenever the rockable bars 17 and 25 are rocked by extension of the power unit 20, the implement units 10 are raised and the wheels 90 lowered, thereby raising the outer end portions of the outer bars 25. By virtue of the double operation of the power unit 20, described above, the bars 17, 25 can be rocked through substantially 90°, it being understood that the braces 28 are removed before this action takes place. However, if the bars 17, 25 are to be rocked only through 45°, it is not necessary to remove the braces 28 as will be clear from FIG. 3, since the outer end of the braces are pivotally connected at 32 with the associated bars 25. Assuming, however, that the implement is to be raised into the position shown in FIG. 5 for transport, and the outer bars and associated implement units are to swing rearwardly into a narrowed position for transport, as illustrated in FIG. 7, the following operations are performed in substantially the order named.

First, the braces 28 are detached and laid on the carriage frame 12 and then the power unit 20 is operated to swing the bars 17, 25 through approximately 45°, bringing the bars 25 and gauge wheels 90 substantially to the position shown in FIG. 3, in which the outer ends of the bar 25 are raised by virtue of the downward movement of the gauge wheels 90 relative thereto. Stands are then placed under the outer ends of the bar 25, one of such stands being indicated at S in FIG. 4. After the stands are placed under the bars 25, the power unit 20 is operated to lower the implement units 10, thus raising the wheels 90 upwardly and permitting the outer ends of the bar 25 to be supported on the associated stands S.

Figure 4:
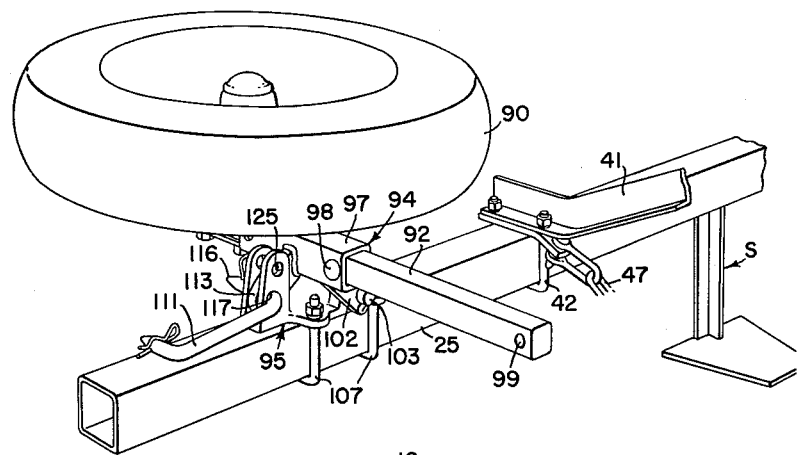
FIG. 4 is a view similar to FIG. 2 showing the outer wheel turned and shifted into a position parallel with the associated support bar but while the latter is still supported on an associated stand.

The next operation to be performed is to take out the U-shaped locking pin 111 and the pin 98, as shown in FIG. 2, after which each wheel 90 may be manually swung through approximately 90° over into the position shown in FIG. 4 parallel to the associated bar 25, it being understood that the bars 25 are supported on the stands S at this time. Swinging the wheel 90 over into the position shown in FIG. 4 brings the apertured end of the lug 113 in line with the apertures 117 in the lug means 121, and insertion of the long end 116 of the locking pin 111 into the registering openings serves to lock the bearing number 94 in its new position (FIG. 4) with the wheel 90 occupying a position in a plane parallel to the associated bar 25. Also, the wheel standard 92 is shifted forwardly and the pin 98 inserted in the sleeve 94 and through the lower opening 99 (FIG. 2) in the wheel standard 92. Next, the power unit 20 is operated to swing the bars 17, 25 through an additional 45°, bringing the implement supporting arms 41 substantially into a vertical position, as illustrated in FIG. 5. This movement of the bars 25 swings the gauge wheels 90, now disposed parallel to the bars 25, into a lower position (FIG. 5) and since the wheels 90 are forward of the axis of rocking of the bars 17, 25, the outer ends of the bar 25 are raised off the stands S, whereupon the latter may be removed. The parts are now arranged as shown in FIG. 5 from which it will be seen that driving the implement forwardly will automatically cause the outer ends of the bars 25 and associated parts to swing rearwardly toward one another until the wheels 90 are in a generally fore and aft extending position, as shown in FIG. 7, the outer wheels 90 trailing behind the carriage wheels 15. If desired, suitable means may be provided for locking the right and left hand bars 25 together in a trailing position (FIG. 7), but preferably the wheels 90 are arranged to have a slight toe-in and therefore under most conditions interconnecting means are not required.

When moving the outfit in trailing transport position (FIG. 7) it is desirable to relieve the hydraulic system of all unnecessary loads, and to this end the locking pin 78 is disposed as shown in FIG. 5, holding the arm 56 in its forwardmost position which locks the center or carriage drawbar 17 in the position shown in FIG. 5 and the bars 27 in the positions shown in FIG. 7.

When it is desired to restore the implement to its operating or widespread position it is preferable to shift the ground wheels or gauge wheels 90 from the positions shown in FIGS. 4, 5 and 7 into the position shown in FIG. 8. This is done by first removing each locking pin 111 from the associated openings 117 in the lug means 121, grasping the associated gauge wheel 90 and shifting the same about a generally vertical axis a small amount sufficient to carry the apertured end of the lug 113 outwardly to a point alined with an outer set of openings 125, and then inserting the end of the pin 111 in the alined openings, as shown in FIG. 8, thus locking the wheels 90 in a rearwardly diverging position. With the wheels 90 in this position, the outfit may then be backed and the wheels 90 will automatically cause the bars 25 to be swung laterally outwardly and around into a position alined laterally with the center or carriage-supported bar 17. The stands may then be reinstalled underneath the outer ends of the arm 25, the cylinder or power unit 20 operated, after the locking pin 78 (FIG. 5) have been removed, to rock the bars 25 around substantially into the position shown in FIG. 4, after which the wheels may be brought back to the position shown in FIG. 2 by a substantial reverse of the operations described above. Then by rocking the bars 17, 25 downwardly, the outer ends are again supported on the wheels 90 and the stands may be removed.

While we have shown and described above the preferred structure in which the principles of this invention have been incorporated, it is to be understood that our invention is not to be limited to the particular means, shown and described above, but that, in fact, widely different means may be employed in the practice of the broader aspects of our invention.

What we claim, therefore, and desire to secure by Letters Patent is:

1. A foldable drawbar for agricultural implements comprising a wheeled carrier frame, a transversely disposed articulated drawbar member rockably mounted on said carrier frame, said member including a center bar supported on said frame and outer bars carried at their inner ends on said center bar and adjustable ground wheel means supporting the outer ends of said outer bars and said wheel means including a wheel axle having a spindle, a ground wheel journaled on said spindle, an axle bearing including a sleeve section slidably receiving said axle, means swingably connecting said axle bearing to the outer end portion of the associated outer bar for movement relative thereto about an axis that is disposed transversely of said associated outer bar, and means locking said axle bearing to said outer bar in any one of a plurality of optional positions about said transverse axis.

2. In a foldable drawbar including a drawbar shaft comprising a center section and an outer section, the improvement comprising an axle bearing pivoted to said outer section for movement relative thereto about a transverse axis, an axle slidable in said axle bearing and carrying a spindle, a ground wheel journaled on said spindle, said axle being disposed non-rotatably in said axle bearing and swingable with the latter about said transverse axis for movement between a first position in which the plane of said ground wheel lies generally parallel with said outer section to a second position in which the plane of said wheel lies generally perpendicular to said outer section and means fixing said axle bearing in a position intermediate said first and second positions and making an acute angle with said outer section.

3. In a foldable drawbar including a rockable drawbar shaft comprising a center section and an outer section, the improvement comprising an axle bearing pivoted to said outer section for movement relative thereto about a transverse axis and including a sleeve section of non-circular cross section, an axle also non-circular in cross section and slidable in said sleeve section and carrying a spindle, a ground wheel journaled on said spindle, and means fixing said axle bearing to said outer section in a position such that the plane of said ground wheel lies at an acute angle with said outer section.

4. In a foldable drawbar for agricultural implements, a wheeled carrier frame, an articulated drawbar means rockable on said frame and including a center bar and outer bars swingable horizontally between a first laterally outwardly extending position and a second rearwardly trailing position, a ground wheel unit connected with the outer portion of each outer bar, and means fixing each ground wheel unit to the outer end of the associated outer bar in a position at an acute angle relative to the associated outer bar so that when the outer bars are in said trailing position, the planes of the ground wheels extending divergingly rearwardly and serve to swing said bars laterally outwardly when the carrier frame and drawbar means are backed.

5. A wheel support for an outrigger bar of an agricultural implement in which the bar is rotatable through 90° from one position to another and in which the wheel support is adapted to carry the outer end of said bar in either of its positions, said wheel support comprising an attachment member, means connected therewith to fix the member to said bar, an axle bearing hingedly connected therewith for swinging about a hinge axis through 90°, a wheel axle slidably but non-rotatably connected therewith, and a ground wheel journaled on said wheel axle.

6. A wheel support for an outrigger bar of an agricultural implement in which the bar is rotatable through 90° from one position to another and in which the wheel support is adapted to carry the outer end of said bar in either of its positions, said wheel support comprising an attachment member, clamping means connected with said attachment member and attachable at different points along said bar to said bar, an axle bearing hingedly connected therewith for swinging about a hinge axis through 90°, a wheel axle slidably but non-rotatably connected therewith, and a ground wheel journaled on said wheel axle.

7. A wheel support for an outrigger bar of an agricultural implement in which the bar is rotatable through 90° from one position to another and in which the wheel support is adapted to carry the outer end of said bar in either of its positions, said wheel support comprising an attachment member, means connected therewith to fix the member to said bar, an axle bearing having a pair of spaced apart apertured lugs, correspondingly spaced apart apertured lugs on said attachment member, a hinge pin extending through said lugs for hingedly connecting said axle bearing to said attachment member for swinging movement relative to said attachment member through 90°, a wheel axle slidable but non-rotatably connected with said axle bearing, a ground wheel journaled on said wheel axle, and means fixing said axle bearing in selected positions about said hinge axis.

8. A wheel support for an outrigger bar of an agricultural implement, said wheel support comprising an attachment member, means connected therewith to fix the member to said bar, an axle bearing hingedly connected therewith for swinging about a hinge axis and including an apertured portion, a ground wheel carried by said axle bearing, an apertured lug on said attachment member, and a locking pin having an end portion insertible in the apertures in said lug and the apertured portion of said bearing and dimensioned to hold said axle bearing in a position disposing said wheel in a given position relative to said outrigger bar, said apertured lug being constructed and arranged so that the apertures come into registry when said pin is removed and said axle bearing swung through 90° to dispose said wheel at a right angle relative to said given position, and means insertible in said registering apertures to lock said axle bearing against swinging relative to said attachment member.

9. The invention set forth in claim 8, further characterized by said last mentioned means comprising a portion of said locking pin.

10. A wheel support for an outrigger bar of an agricultural implement said wheel support comprising an attachment member, means connected therewith to fix the member to said bar, an axle bearing hingedly connected therewith for swinging about a hinge axis, a ground wheel carried by said axle bearing, an apertured lug on said axle bearing, an apertured lug on said attachment member, and a locking pin having end portions insertible in the apertures in said lugs and dimensioned to hold said axle bearing in a position disposing said wheel in a given position relative to said outrigger bar, auxiliary apertured means on said attachment member adapted to register with the apertured lug on said axle bearing when the latter is swung about said hinge axis to a position making a relatively small acute angle relative to said bar, and means insertible in said registering apertures to lock said axle bearing against swinging relative to said attachment member.

11. A wheel support for an outrigger bar of an agricultural implement in which said outrigger bar is shiftable through 90° about its longitudinal axis, said wheel support comprising an attachment member, means connected therewith to fix the member to one side of said bar, an axle bearing hingedly connected therewith for swinging about a hinge axis extending transversely of said bar and parallel to the plane of said one side thereof, a wheel axle connected with said axle bearing and shiftable longitudinally of said axle bearing and swingable therewith through said 90°, a ground wheel journaled on said wheel axle, means connected between said axle bearing and said attachment member for holding said axle bearing and said wheel in different positions about said hinge axis, and means holding said wheel axle in different positions longitudinally of said axle bearing.

12. A wheel support for an outrigger bar of an agricultural implement in which the bar is rotatable through 90° from one position to another and in which the wheel support is adapted to carry the outer end of said bar in either of its positions, said wheel support comprising an attachment member, means connected therewith to fix the member to said bar, an axle bearing hingedly connected therewith for swinging through 90° about a hinge axis extending transversely of said outrigger bar, said axis being generally horizontal in one position of said bar and generally vertical in another position of said bar, a wheel axle connected with said axle bearing and swingable therewith about said hinge axis relative to said outrigger bar, a ground wheel journaled on said wheel axle, said wheel axle also being shiftable in said axle bearing in a direction generally parallel with said hinge axis, whereby when said axle bearing is swung into a position to dispose said ground wheel in a plane parallel to said outrigger bar said wheel may be shifted bodily relative to said outrigger bar, means connected with said axle bearing and said attachment member for holding said wheel against movement about said hinge axis, and means fixing said wheel axle in different positions in said axle bearing.

References Cited in the file of this patent

UNITED STATES PATENTS

| | | |
|---|---|---|
| 1,963,426 | Taylor | June 19, 1934 |
| 2,518,303 | Godley et al. | Aug. 8, 1950 |
| 2,750,724 | Stephenson | June 19, 1956 |
| 2,778,182 | Malmgren | Jan. 22, 1957 |
| 2,800,758 | Schmied | July 30, 1957 |
| 2,901,268 | Christensen | Aug. 25, 1959 |